United States Patent
Huang

(10) Patent No.: US 9,501,397 B2
(45) Date of Patent: Nov. 22, 2016

(54) DATA WRITING METHOD, MEMORY CONTROLLER, AND MEMORY STORAGE APPARATUS

(75) Inventor: Yi-Hsiang Huang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 887 days.

(21) Appl. No.: 12/954,681

(22) Filed: Nov. 26, 2010

(65) Prior Publication Data
US 2012/0079231 A1    Mar. 29, 2012

(30) Foreign Application Priority Data

Sep. 23, 2010  (TW) ............................... 99132195 A

(51) Int. Cl.
*G06F 12/00* (2006.01)
*G06F 12/02* (2006.01)

(52) U.S. Cl.
CPC ... *G06F 12/0246* (2013.01); *G06F 2212/7202* (2013.01)

(58) Field of Classification Search
USPC ........................................................ 711/206
See application file for complete search history.

(56) References Cited

U.S. PATENT DOCUMENTS

| | | | |
|---|---|---|---|
| 5,956,473 A * | 9/1999 | Ma et al. | 714/5.1 |
| 8,275,931 B2 * | 9/2012 | Yeh | 711/103 |
| 8,291,155 B2 * | 10/2012 | Lai et al. | 711/103 |
| 2004/0193818 A1 * | 9/2004 | Hashimoto et al. | 711/164 |
| 2009/0265505 A1 * | 10/2009 | Yang et al. | 711/103 |
| 2010/0153672 A1 | 6/2010 | Jogand-Coulomb et al. | |
| 2010/0180069 A1 | 7/2010 | Yeh | |

FOREIGN PATENT DOCUMENTS

CN    101833437    9/2010

OTHER PUBLICATIONS

"Office Action of China Counterpart Application", issued on Dec. 20, 2013, p. 1-p. 6.
"Office Action of Taiwan Counterpart Application", issued on Dec. 30, 2013, p. 1-p. 17.

* cited by examiner

*Primary Examiner* — Jared Rutz
*Assistant Examiner* — Hamdy S Ahmed
(74) *Attorney, Agent, or Firm* — Jiang Chyun IP Office

(57) ABSTRACT

A data writing method and a memory controller and a memory storage apparatus using the same are provided. The data writing method includes grouping a plurality of physical blocks into a plurality of physical units, grouping the physical units into at least a data area and a free area, and configuring a plurality of logical units for mapping to the physical units of the data area. The data writing method also includes getting a physical unit from the free area, writing data in at least one of the logical units into the gotten physical unit, and writing an end mark into the gotten physical unit, and in the gotten physical unit, the end mark follows the data belonging to the at least one logical unit. Thereby, the storage space of each physical unit can be effectively used, and the lifespan of the memory storage apparatus can be prolonged.

19 Claims, 13 Drawing Sheets

DATA WRITING METHOD, MEMORY CONTROLLER, AND MEMORY STORAGE APPARATUS

CROSS-REFERENCE TO RELATED APPLICATION

This application claims the priority benefit of Taiwan application serial no. 99132195, filed on Sep. 23, 2010. The entirety of the above-mentioned patent application is hereby incorporated by reference herein and made a part of this specification.

BACKGROUND

1. Technology Field

The present invention generally relates to a data writing method, and more particularly, to a data writing method for a non-volatile memory module and a memory controller and a memory storage apparatus using the same.

2. Description of Related Art

Along with the widespread of digital cameras, cell phones, and MP3 in recently years, the consumers' demand to digital storage media has increased drastically. Flash memory is one of the most adaptable storage media to be carried around and used for storing digital files due to its many characteristics such as data non-volatility, low power consumption, small volume, and non-mechanical structure.

Conventionally, a flash memory storage apparatus is usually used for storing user data. For example, a user uses a flash drive for storing digital files or uses a memory card as the storage medium of a portable device, such as a digital camera or a MP3 player. Such a flash memory storage apparatus is usually used for storing digital data in large quantities (for example, above 64 Kb or 128 Kb).

The storage capacity of flash memory storage apparatus has increased and the cost thereof has dropped along with the development of flash memory technology. Thus, many computer manufacturers start to use solid state drive (SSD) having flash memory as its storage medium as the master hard drive of computer system. The operating system of a computer system repeatedly writes and updates data of small quantities (for example, under 4 Kb or 8 Kb) in the master hard drive of the computer system.

Due to the physical characteristics of flash memories, each memory cell in a flash memory can only be programmed in a single direction (i.e., each bit in the memory cell can only be programmed from 1 to 0). Thus, data previously stored in a memory cell of a flash memory has to be erased before a new data can be written into the memory cell.

Regarding the design of flash memory storage system, the flash memory physical blocks in a flash memory storage system are usually grouped into a plurality of physical units (i.e., each physical unit is composed of one or more physical blocks). Each physical unit has at least one flash memory cell. Each memory cell is composed of at least one transistor (for example, MOSFET or other transistor or logic circuit) and can store at least one bit. Besides, the physical units are further grouped into a data area and a free area. The physical units in the data area are used for storing valid data written through write commands, and the physical units in the free area are used for substituting the physical units in the data area when the write commands are executed. To be specific, when a flash memory storage system receives a write command from a host and is about to write data into a physical unit in the data area, the flash memory storage system gets a physical unit from the free area and writes the old valid data in the physical unit to be written in the data area and the new data into the physical unit gotten from the free area, and the flash memory storage system associates the physical unit containing the new data with the data area, erases the physical unit in the data area, and associates it with the free area. In order to allow the host to successfully access the physical units that are alternatively used for storing data, the flash memory storage system configures logical units to be mapped to the physical units. To be specific, the flash memory storage system converts logical access addresses accessed by the host into corresponding logical units and records and updates the mapping relationship between the logical units and the physical units in the data area in a logical unit-physical unit mapping table so as to reflect the alternation of the physical units. Thus, the host simply accesses data according to the logical access addresses, while the flash memory storage system actually accesses data in the corresponding physical units according to the logical unit-physical unit mapping table.

Based on foregoing operation mechanism of flash memory storage system, when a flash memory storage system is used as a master hard drive of a computer system, because the computer system repeatedly writes and updates data of small quantities, the physical units in the flash memory storage system are frequently erased to be alternatively used for writing data from the computer system. Since each physical block in a physical unit can only be erased for a limited number of times (for example, a physical block is damaged after it is erased 10,000 times), the lifespan of the flash memory storage apparatus may be greatly shortened by frequently erasing the physical units thereof.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method and a memory controller, wherein the erasing times of physical units are reduced so that the performance of a memory storage apparatus can be effectively improved and the lifespan of the memory storage apparatus can be prolonged.

The present invention is also directed to a memory storage apparatus with prolonged lifespan and improved writing performance.

According to an exemplary embodiment of the present invention, a data writing method for writing data into a plurality of physical blocks is provided. The data writing method includes grouping the physical blocks into a plurality of physical units, grouping the physical units into at least a data area and a free area, and configuring a plurality of logical units for mapping to the physical units of the data area. The data writing method also includes gets a physical unit from the free area, writing at least one data belonging to at least one logical unit among the logical units into the gotten physical unit, and writing an end mark into the gotten physical unit, wherein in the gotten physical unit, the end mark follows the data belonging to the at least one logical unit.

According to an exemplary embodiment of the present invention, a data writing method for writing data into a plurality of physical blocks is provided. The data writing method includes grouping the physical blocks into a plurality of physical units, grouping the physical units into at least a data area and a free area, and configuring a plurality of logical units for mapping to the physical units of the data area. The data writing method also includes receiving a first data belonging to a first logical unit among the logical units, wherein the first logical unit is mapped to a first physical unit among the physical units of the data area. The data writing method further includes determining whether the first logical unit enters a random writing state, and when the first logical unit enters the random writing state, the data writing method further includes getting a third physical unit from the free area and sequentially writing the first data into the third physical unit. In addition, the data writing method includes receiving a second data belonging to a second logical unit among the logical units, wherein the second logical unit is mapped to a second physical unit among the physical units of the data area. The data writing method also includes determining whether the second logical unit enters the random writing state, and when the second logical unit enters the random writing state, the data writing method also includes sequentially writing the second data into the third physical unit. The data writing method further includes executing a data merging procedure on the first logical unit and the second logical unit and writing an end mark into the third physical unit after executing the data merging procedure on the first logical unit and the second logical unit, wherein in the third physical unit, the end mark follows the first data and the second data.

According to an exemplary embodiment of the present invention, a memory controller for managing a non-volatile memory module is provided. The non-volatile memory module has a plurality of physical blocks. The memory controller includes a host interface, a memory interface, and a memory management circuit. The host interface is configured for coupling to a host system, and the memory interface is configured for coupling to the non-volatile memory module. The memory management circuit is coupled to the host interface and the memory interface, and configured for executing the data writing method described above.

According to an exemplary embodiment of the present invention, a memory storage system including a connector, a non-volatile memory module, and a memory controller is provided. The non-volatile memory module has a plurality of physical blocks. The memory controller is coupled to the non-volatile memory module and the connector, and configured for executing the data writing method described above.

As described above, the data writing method and the memory controller provided by exemplary embodiments of the present invention can effectively prolong the lifespan of a memory storage apparatus. In addition, a memory storage apparatus having a memory controller which uses foregoing data writing method has prolonged lifespan.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
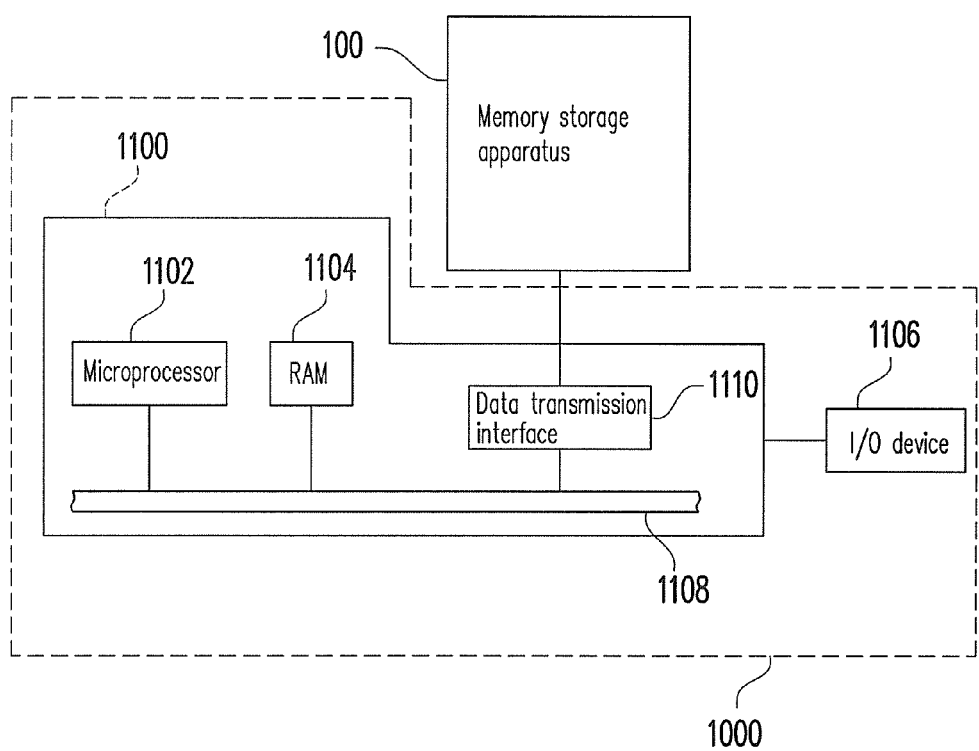
FIG. 1A illustrates a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (also referred to as a memory storage system) includes a non-volatile memory module and a controller (also referred to as a control circuit). The memory storage apparatus is usually used with a host system so that the host system can write data into or read data from the memory storage apparatus.

FIG. 1A illustrates a host system and a memory storage apparatus according to an exemplary embodiment of the present invention.

Figure 1B:
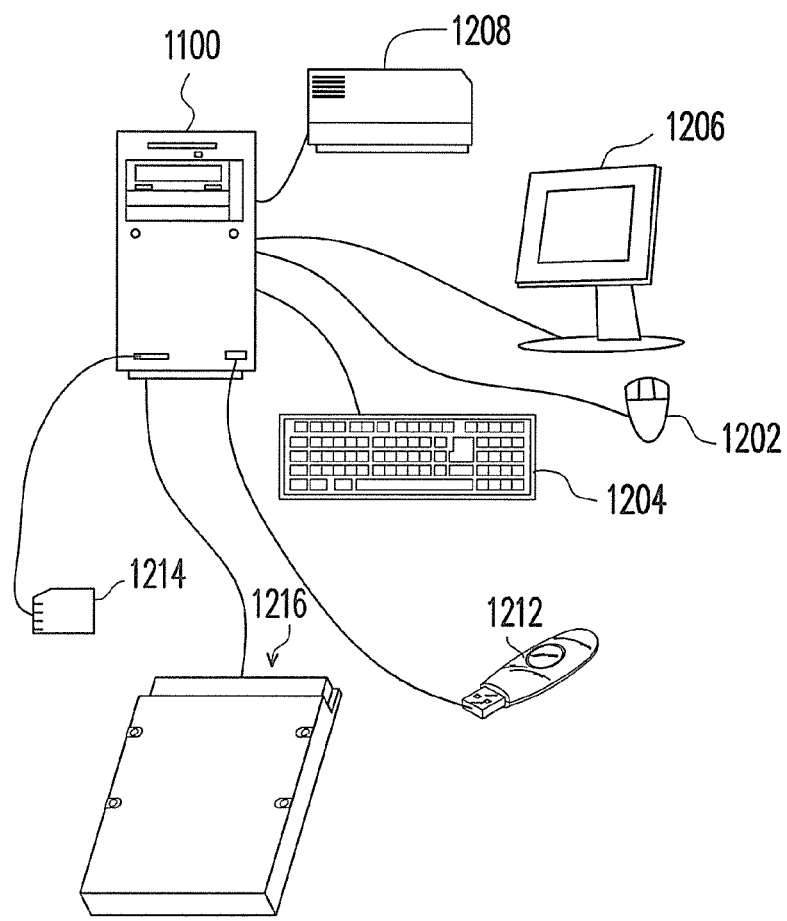
FIG. 1B is a diagram of a computer, an input/output (I/O) device, and a memory storage apparatus according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the I/O device 1106, and the I/O device 1106 may further include other devices.

In the present exemplary embodiment, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 may be a non-volatile memory storage apparatus, such as the flash drive 1212, the memory card 1214, or the solid state drive (SSD) 1216 illustrated in FIG. 1B.

Figure 1C:
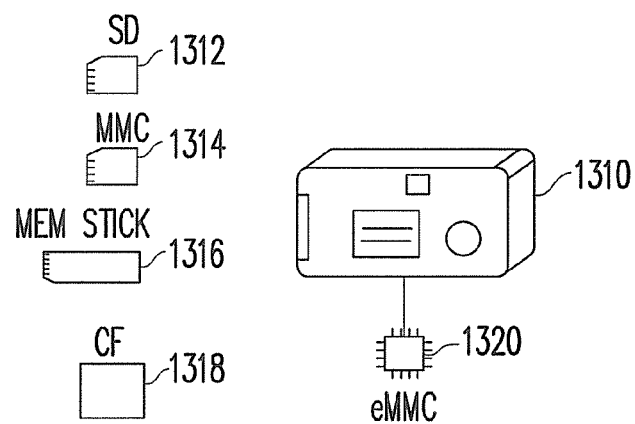
FIG. 1C is a diagram of a host system and a memory storage apparatus according to another exemplary embodiment of the present invention.

Generally speaking, the host system 1000 may be any system that can store data. Even though the host system 1000 is described as a computer system in the present exemplary embodiment, the host system 1000 may also be a digital camera, a video camera, a communication device, an audio player, or a video player in another exemplary embodiment of the present invention. For example, if the host system is a digital camera (video camera) 1310, the non-volatile memory storage apparatus is a secure digital (SD) card 1312, a multi media card (MMC) card 1314, a memory stick 1316, a compact flash (CF) card 1318, or an embedded storage device 1320 (as shown in FIG. 1C) used together with the digital camera 1310. The embedded storage device 1320 includes embedded MMC (eMMC). It should be mentioned that the eMMC is directly coupled to the substrate of the host system.

Figure 2:
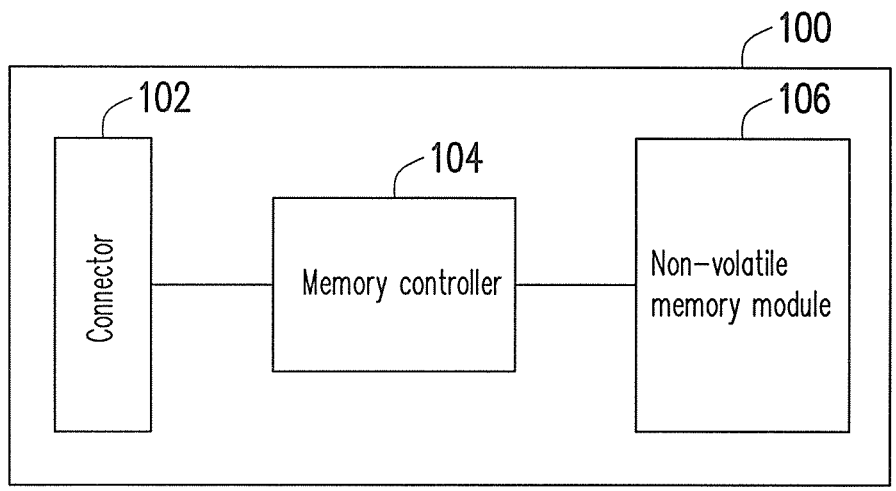
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a non-volatile memory module 106.

In the present exemplary embodiment, the connector 102 is a universal serial bus (USB) connector. However, the present invention is not limited thereto, and the connector 102 may also be an Institute of Electrical and Electronic Engineers (IEEE) 1394 connector, a peripheral component interconnect (PCI) express connector, a serial advanced technology attachment (SATA) connector, a SD interface connector, a memory stick (MS) interface connector, a MMC interface connector, a CF interface connector, an integrated device electronics (IDE) connector, or any other suitable connector.

The memory controller 104 executes a plurality of logic gates or control instructions implemented in a hardware form or a firmware form and performs various data operations on the non-volatile memory module 106 according to instructions of the host system 1000. In the present exemplary embodiment, the memory controller 104 manages the non-volatile memory module 106 according to the data writing method and the memory management method provided by exemplary embodiments of the present invention. The data writing method and the memory management method will be described in detail below with reference to accompanying drawings.

The non-volatile memory module 106 is coupled to the memory controller 104 and used for storing data written by the host system 1000. In the present exemplary embodiment, the non-volatile memory module 106 is a rewritable non-volatile memory module. For example, the non-volatile memory module 106 may be a multi level cell (MLC) NAND flash memory module. However, the present invention is not limited thereto, and the non-volatile memory module 106 may also be a single level cell (SLC) NAND flash memory module, any other flash memory module, or any memory module having the same characteristics.

Figure 3:
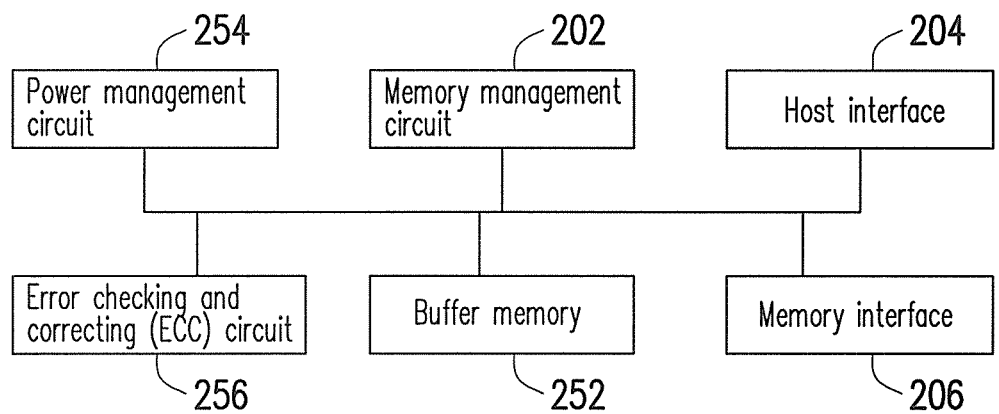
FIG. 3 is a schematic block diagram of a memory controller according to an exemplary embodiment of the present invention.

FIG. 3 is a schematic block diagram of a memory controller according to an exemplary embodiment of the present invention.

Referring to FIG. 3, the memory controller 104 includes a memory management circuit 202, a host interface 204, and a memory interface 206.

The memory management circuit 202 controls the operation of the memory controller 104. To be specific, the memory management circuit 202 has a plurality of control instructions, and when the memory storage apparatus 100 is in operation, the control instructions are executed to manage the non-volatile memory module 106 through the data writing method and the memory management method provided by the present exemplary embodiment.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to accomplish the data writing method and the memory management method provided by the present exemplary embodiment.

In another exemplary embodiment of the present invention, the control instructions of the memory management circuit 202 may also be stored in a specific area (for example, the system area exclusively used for storing system data in a memory module) of the non-volatile memory module 106 as program codes. In addition, the memory management circuit 202 has a microprocessor unit (not shown), a ROM (not shown), and a RAM (not shown). In particular, the ROM has a driving code, and when the memory controller 104 is enabled, the microprocessor unit first executes the driving code to load the control instructions from the non-volatile memory module 106 into the RAM of the memory management circuit 202. After that, the microprocessor unit runs the control instructions to execute the data writing method and the memory management method according to the exemplary embodiment of the present invention. Moreover, in yet another exemplary embodiment of the present invention, the control instructions of the memory management circuit 202 may also be implemented in a hardware form.

The host interface 204 is coupled to the memory management circuit 202, and configured for receiving and identifying instructions and data from the host system 1000. Namely, the instructions and data of the host system 1000 are transmitted to the memory management circuit 202 through the host interface 204. In the present exemplary embodiment, the host interface 204 is, corresponding to the connector 102, a USB interface. However, the present invention is not limited thereto, and the host interface 204 may also be a PATA interface, an IEEE 1394 interface, a PCI express interface, a SATA interface, a SD interface, a MS interface, a MMC interface, a CF interface, an IDE interface, or any other suitable data transmission interface.

The memory interface 206 is coupled to the memory management circuit 202, and configured for accessing the non-volatile memory module 106. Namely, data to be written into the non-volatile memory module 106 is converted by the memory interface 206 into a format acceptable to the non-volatile memory module 106.

In an exemplary embodiment of the present invention, the memory controller 104 further includes a buffer memory 252. The buffer memory 252 is coupled to the memory management circuit 202 and configured for temporarily storing data and instructions from the host system 1000 or data from the non-volatile memory module 106.

In an exemplary embodiment of the present invention, the memory controller 104 further includes a power management circuit 254. The power management circuit 254 is coupled to the memory management circuit 202, and configured controlling the power supply of the memory storage apparatus 100.

In an exemplary embodiment of the present invention, the memory controller 104 further includes an error checking and correcting (ECC) circuit 256. The ECC circuit 256 is coupled to the memory management circuit 202, and configured for executing an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the non-volatile memory module 106. Subsequently, when the memory management circuit 202 reads data from the non-volatile memory module 106, it also reads the ECC code corresponding to the data, and the ECC circuit 256 executes the ECC procedure on the data according to the ECC code.

Figure 4:
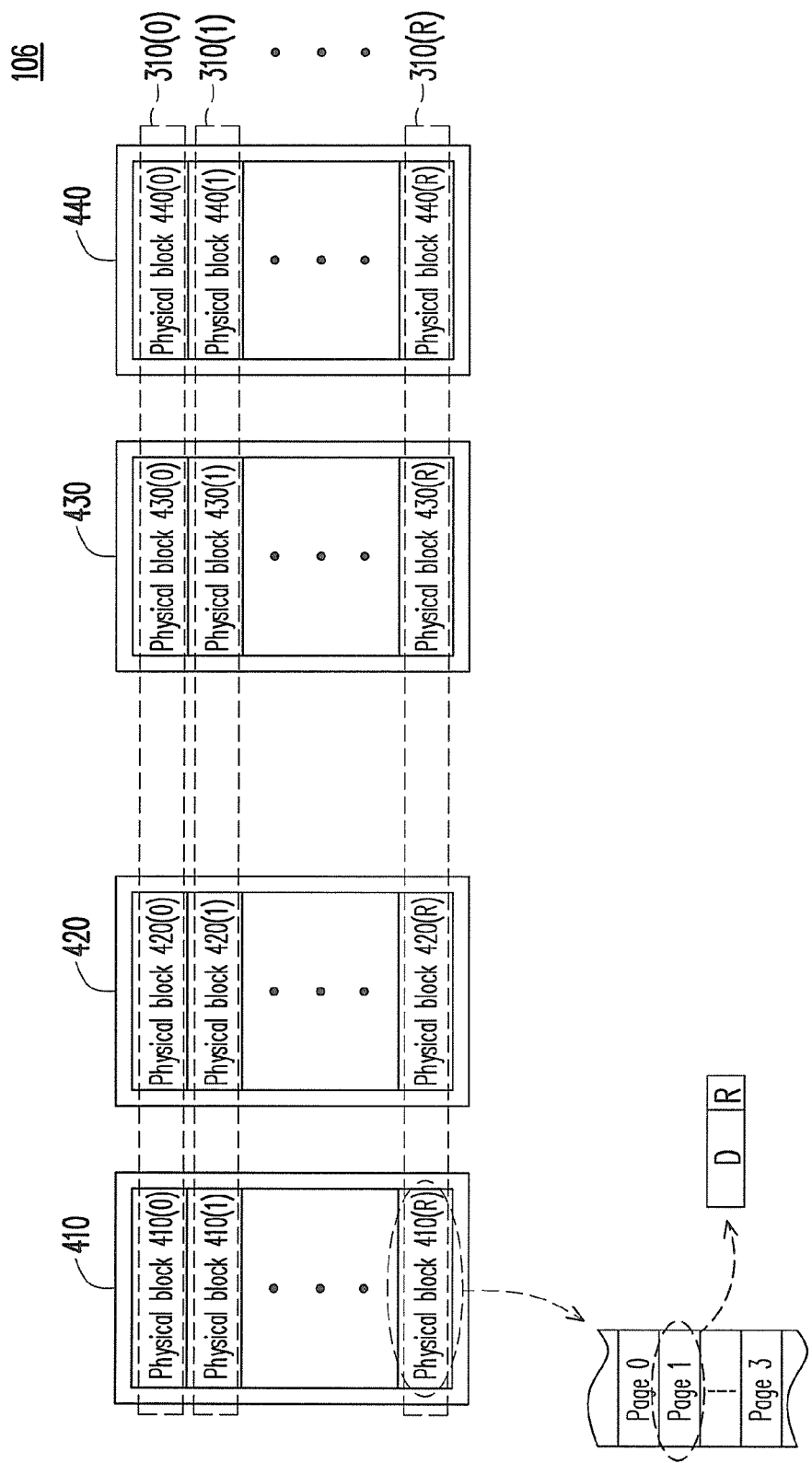
FIG. 4 is a schematic block diagram of a non-volatile memory module according to an exemplary embodiment of the present invention.

FIG. 4 is a schematic block diagram of a non-volatile memory module according to an exemplary embodiment of the present invention.

Referring to FIG. 4, the non-volatile memory module 106 includes a first sub memory module 410, a second sub memory module 420, a third sub memory module 430, and a fourth sub memory module 440. The first sub memory module 410 has physical blocks 410(0)-410(R), the second sub memory module 420 has physical blocks 420(0)-420(R), the third sub memory module 430 has physical blocks 430(0)-430(R), and the fourth sub memory module 440 has physical blocks 440(0)-440(R). The first sub memory module 410, the second sub memory module 420, the third sub memory module 430, and the fourth sub memory module 440 may be coupled to the memory controller 104 respectively through individual data buses. However, in another exemplary embodiment of the present invention, the first sub memory module 410, the second sub memory module 420, the third sub memory module 430, and the fourth sub memory module 440 may also be coupled to the memory controller 104 through one data bus or two data buses. Each physical block in the first sub memory module 410, the second sub memory module 420, the third sub memory module 430, and the fourth sub memory module 440 has a plurality of physical pages. Those physical pages in the same physical block can be written individually but have to be erased at the same time. Each physical block may be composed of 128 physical pages. However, the present invention is not limited thereto, and each physical block may also be composed of 64, 256, or any other number of physical pages.

To be specific, physical block is the smallest unit for erasing data. Namely, each physical block contains the least number of memory cells that are erased together. Physical page is the smallest programming unit. Namely, each physical page is the smallest unit for writing data. However, in another exemplary embodiment of the present invention, the smallest unit for writing data may also be sector or other units. Each physical page usually has a data bit area D and a redundancy bit area R. The data bit area D stores user data, and the redundancy bit area R stores system data (for example, ECC codes).

In addition, the physical blocks in the first sub memory module 410, the second sub memory module 420, the third sub memory module 430, and the fourth sub memory module 440 are usually grouped into several zones. By managing the physical blocks 410(0)-410-(R), the physical blocks 420(0)-420(R), the physical blocks 430(0)-430(R), and the physical blocks 440(0)-440(R) in unit of zones, the execution parallelism of operations is increased and the management of these physical blocks is simplified.

It should be mentioned that even though the present exemplary embodiment is described by taking a non-volatile memory module 106 with four sub memory modules as an example, the present invention is not limited thereto.

In the present exemplary embodiment, the memory management circuit 202 of the memory controller 104 groups the physical blocks 410(0)-410-(R), the physical blocks 420(0)-420(R), the physical blocks 430(0)-430(R), and physical blocks 440(0)-440(R) into physical units 310(0)-310(R) and manages the non-volatile memory module 106 in unit of these physical units. Namely, if each physical block has 128 physical pages, each physical unit has 512 physical pages, and the memory management circuit 202 manages the non-volatile memory module 106 in unit of 512 physical pages.

Figure 5:
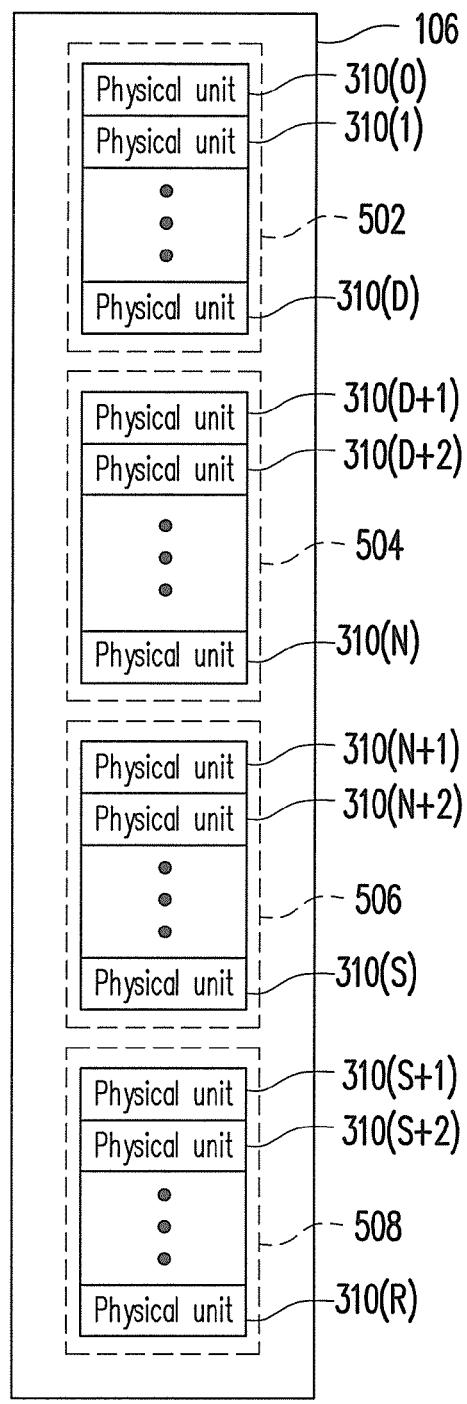
FIG. 5 and FIG. 6 are diagrams of managing physical units according to an exemplary embodiment of the present invention.
Figure 6:
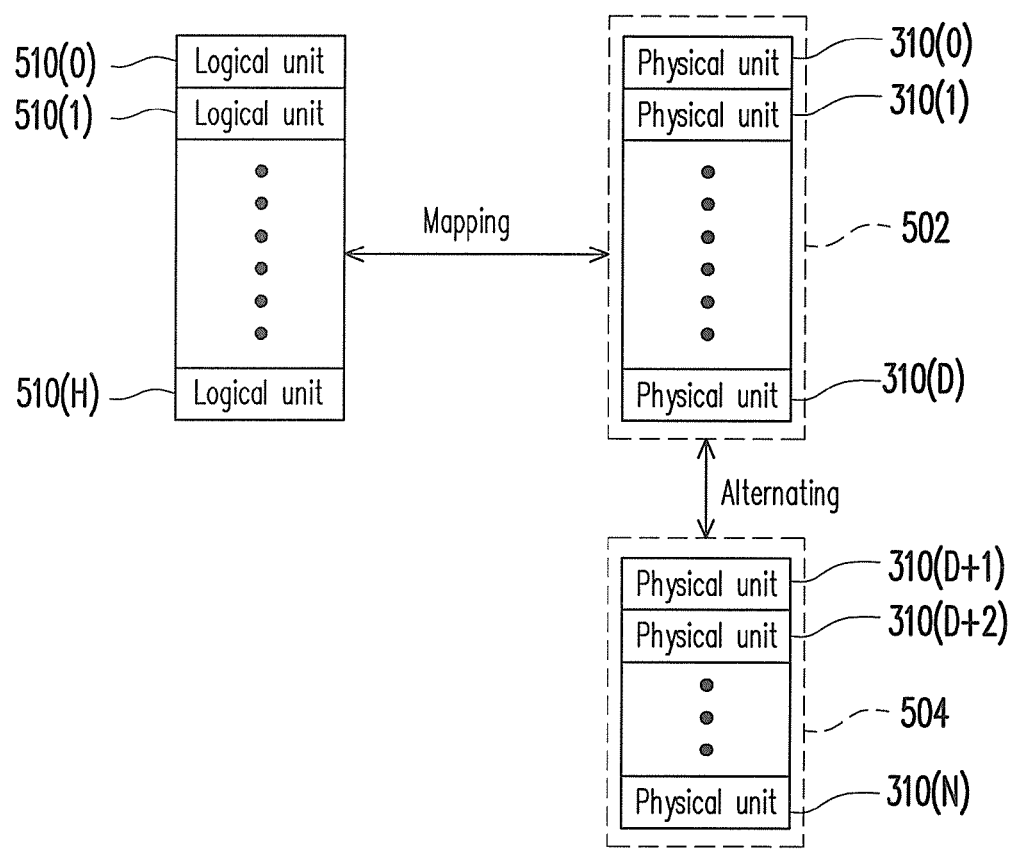

FIG. 5 and FIG. 6 are diagrams of managing physical units according to an exemplary embodiment of the present invention.

Referring to FIG. 5, the memory management circuit 202 of the memory controller 104 logically groups the physical units 310(0)-310(R) into a data area 502, a free area 504, a system area 506, and a replacement area 508.

The physical units logically belonging to the data area 502 and the free area 504 are used for storing data from the host system 1000. To be specific, the physical units in the data area 502 are used for storing data, and the physical units in the free area 504 are used for substituting the physical units in the data area 502. Thus, the physical units in the free area 504 are either blank or available physical units (i.e., no data is recorded therein or data recorded therein has been marked as invalid data). In other words, data in the physical units in the free area 504 have been erased, or before the physical units in the free area 504 are gotten for storing data, data in the gotten physical units are erased. Accordingly, the physical units in the free area 504 are available physical units.

The physical units logically belonging to the system area 506 are used for recording system data, such as the manufacturer and model of the non-volatile memory module, the number of physical blocks in the non-volatile memory module, and the number of physical pages in each physical block.

The physical units logically belonging to the replacement area 508 are replacement physical units. For example, when the non-volatile memory module 106 is manufactured, 4% of its physical units are reserved for replacement purpose. Namely, when a physical unit in the data area 502, the free area 504, or the system area 506 is damaged, a physical unit in the replacement area 508 is used for replacing the damaged physical unit. Accordingly, if there are still normal physical units in the replacement area 508 and a physical unit is damaged, the memory management circuit 202 gets a normal physical unit from the replacement area 508 to replace the damaged physical unit. If there is no normal physical unit in the replacement area 508 and a physical unit is damaged, the memory management circuit 202 announces that the memory storage apparatus 100 is in a write-protect status and the memory storage apparatus 100 cannot be used for writing data anymore.

In particular, the numbers of physical units in the data area 502, the free area 504, the system area 506, and the replacement area 508 vary with different memory specifications. In addition, during the operation of the memory storage apparatus 100, the grouping of the data area 502, the free area 504, the system area 506, and the replacement area 508 may dynamically be changed. For example, when a physical unit in the free area 504 is damaged and replaced by a physical unit in the replacement area 508, the physical unit originally belonging to the replacement area 508 is associated with the free area 504.

Referring to FIG. 6, as described above, the physical units in the data area 502 and the free area 504 are alternatively used for storing data written by the host system 1000. In the present exemplary embodiment, the memory management circuit 202 configures the logical units 510(0)-510(H) for mapping to the physical units that are alternatively used for storing data, and the memory management circuit 202 maps the logical units 510(0)-510(H) to logical access addresses accessed by the host system 1000 so that the host system 1000 can access data accordingly.

For example, the memory management circuit 202 initially maps the logical units 510(0)-510(H) to the physical units in the data area 502. To be specific, after the memory storage apparatus 100 is manufactured, the logical units 510(0)-510(H) are respectively mapped to the physical units 310(0)-310(D) of the data area 502. Namely, one logical unit is mapped to one physical unit in the data area 502. Herein the memory management circuit 202 establishes a logical unit-physical unit mapping table to record the mapping relationship between the logical units and the physical units. Namely, the memory management circuit 202 converts the logical access addresses to be accessed by the host system 1000 into corresponding logical units so that data can be accessed in the physical addresses according to the logical unit-physical unit mapping table.

Figure 7:
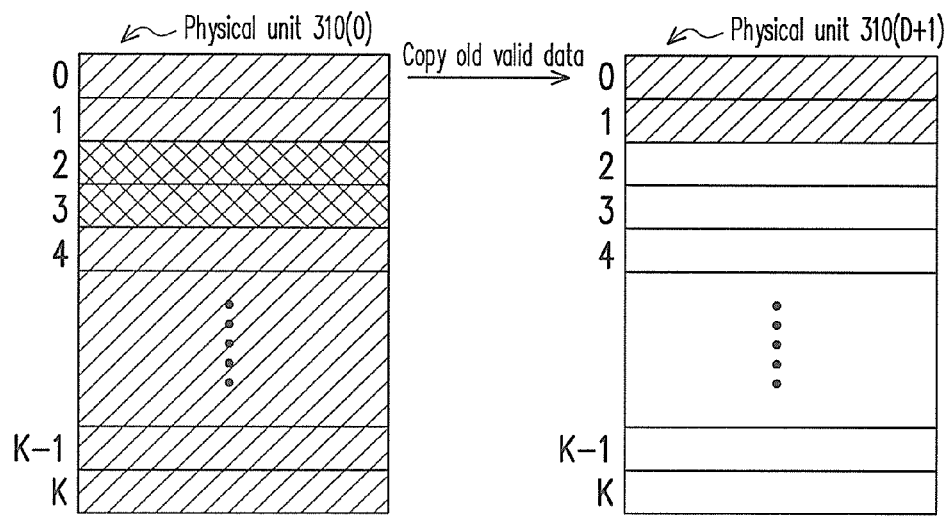
FIGS. 7-9 illustrate an example of writing data into a non-volatile memory module in a general writing mode according to an exemplary embodiment of the present invention.
Figure 8:
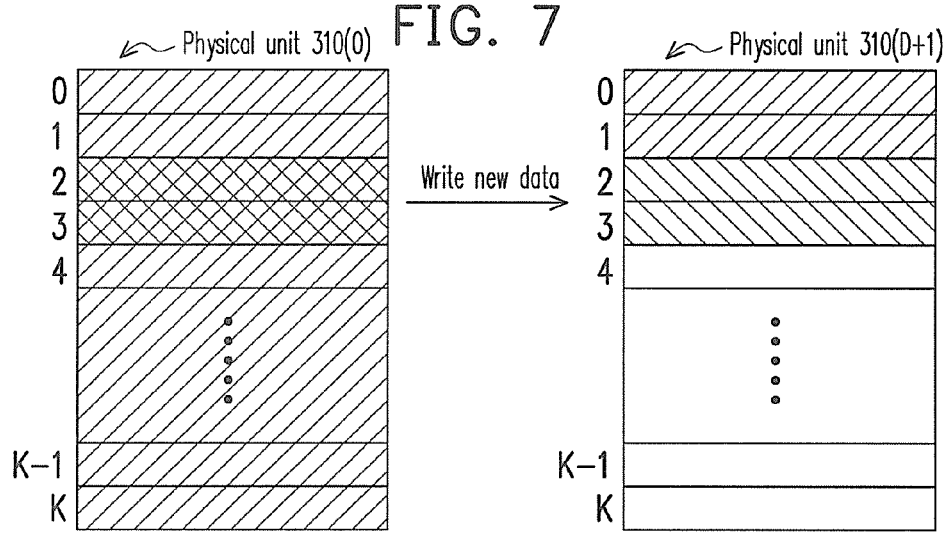
Figure 9:
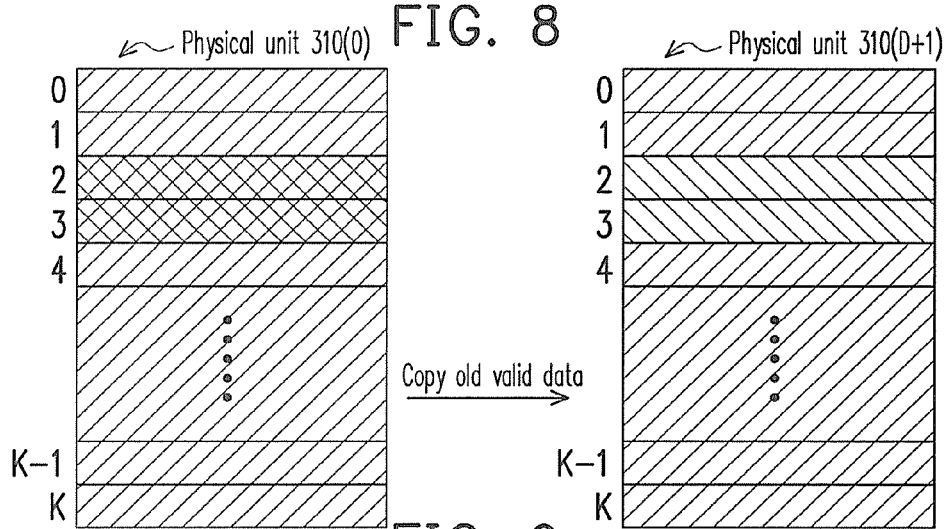

FIGS. 7-9 illustrate an example of writing data into a non-volatile memory module in a general writing mode according to an exemplary embodiment of the present invention.

Referring to FIGS. 7-9, assuming that the logical unit 510(0) is mapped to the physical unit 310(0), when the memory controller 104 receives a write command from the host system 1000 and is about to write data into a logical access address corresponding to the logical unit 510(0), the memory management circuit 202 identifies that the logical unit 510(0) is currently mapped to the physical unit 310(0) according to the logical unit-physical unit mapping table and gets the physical unit 310(D+1) from the free area 504 to substitute the physical unit 310(0). However, at the time when the memory management circuit 202 writes the new data into the physical unit 310(D+1), the memory management circuit 202 does not instantly move all valid data in the physical unit 310(0) to the physical unit 310(D+1) and erase the physical unit 310(0). To be specific, the memory management circuit 202 copies the valid data before the physical page to be written in the physical unit 310(0) (i.e., the data in the $0^{th}$ physical page and the $1^{st}$ physical page of the physical unit 310(0)) to the $0^{th}$ physical page and the $1^{st}$ physical page of the physical unit 310(D+1) (as shown in FIG. 7), and writes the new data into the $2^{nd}$ physical page and the $3^{rd}$ physical page of the physical unit 310(D+1) (as shown in FIG. 8). At this time, the memory management circuit 202 has finished the data writing operation. Because the valid data in the physical unit 310(0) may become invalid in the next operation (for example, a write command), instantly moving all the valid data in the physical unit 310(0) to the physical unit 310(D+1) may become meaningless. Besides, because the data has to be written into the physical pages of a physical unit in sequence, the memory management circuit 202 first only moves the valid data before the physical page to be written.

In the present exemplary embodiment, the operation for temporarily maintaining such a mother-child relationship (i.e., the physical unit 310(0) and the physical unit 310(D+1)) is referred to as opening mother-child units, wherein the original physical unit is referred to as a mother physical unit while the substitute physical unit is referred to as a child physical unit.

Subsequently, the memory management circuit 202 integrates the physical unit 310(0) and the physical unit 310(D+1) into a single physical unit only when the contents in the physical unit 310(0) and the physical unit 310(D+1) need to be merged, so that the efficiency in using these physical units can be improved. Herein the operation for merging the mother-child units is referred to as a data merging procedure or closing mother-child units. For example, as shown in FIG. 9, while closing the mother-child units, the memory management circuit 202 copies the remaining valid data in the physical unit 310(0) (i.e., the data in the $4^{th}$-$(K)^{th}$ physical pages of the physical unit 310(0)) to the $4^{th}$-$(K)^{th}$ physical pages of the physical unit 310(D+1). Then, the memory management circuit 202 erases the physical unit 310(0) and links it to the free area 504. Meanwhile, the memory management circuit 202 associates the physical unit 310(D+1) with the data area 502. Namely, the memory management circuit 202 re-maps the logical unit 510(0) to the physical unit 310(D+1) in the logical unit-physical unit mapping table. Additionally, in the present exemplary embodiment, the memory management circuit 202 establishes a free area physical unit table (not shown) to record the physical units currently associated with the free area. It should be mentioned that there is a limited number of physical units in the free area 504. Accordingly, during the operation of the memory storage apparatus 100, only a limited number of mother-child units can be opened. Thus, when the memory storage apparatus 100 receives a write command from the host system 1000, if the number of opened mother-child units has reached its upper limit, the memory management circuit 202 needs to close one set of mother-child units (i.e., to execute the operation for closing mother-child units) before it can executes the write command. The writing operation illustrated in FIGS. 7-9 is referred to as a general writing mode.

In the present exemplary embodiment, the memory management circuit 202 of the memory controller 104 further executes a random writing mode to write data besides foregoing the general writing mode.

To be specific, because the programming specification of non-volatile memory module requests data to be written from the first physical page to the last physical page in each physical block and each bit to be programmed only once (i.e., from "1" to "0"), once data is written into a physical page of a physical block, the data can only be updated by getting a physical block from the free area 504 and performing the steps illustrated in FIGS. 7-9 again. Thus, when the data (for example, the data in the $0^{th}$ physical page and the $1^{st}$ physical page in FIG. 7) just moved to a physical block has to be updated before the operation for closing mother-child units illustrated in FIG. 9 is performed (i.e., in the temporary state illustrated in FIG. 8), the old data that has been moved has to be moved again. In particular, if the memory storage apparatus 100 is used as a system hard drive (i.e., the hard drive for installing an operating system) of the host system 1000, the host system 1000 accesses a small amount of data at the same logical access address. For example, the host system 1000 frequently updates the file allocation table (FAT). In this case, the memory management circuit 202 determines that the logical unit enters a random writing state and writes the data in the logical unit into the non-volatile memory module 106 in a random writing mode. For example, while writing data in the random writing mode, the memory management circuit 202 selects a physical unit from the free area 504 as a random physical unit and writes the new data into the selected physical unit by starting from the first physical page without performing the operation illustrated in FIG. 7 (i.e., the operation for copying valid data). Besides, when the random writing state ends, the memory management circuit 202 selects another physical unit from the free area 504 to perform the data merging procedure, so as to move all the valid data corresponding to the logical unit into the selected physical unit.

Particularly, in the present exemplary embodiment, the memory management circuit 202 writes the data in one logical unit or multiple logical units in the random writing state into the same random physical unit. For example, in the present exemplary embodiment, the memory management circuit 202 writes the data of two logical units in the random writing state into the same random physical unit.

Figure 10A:
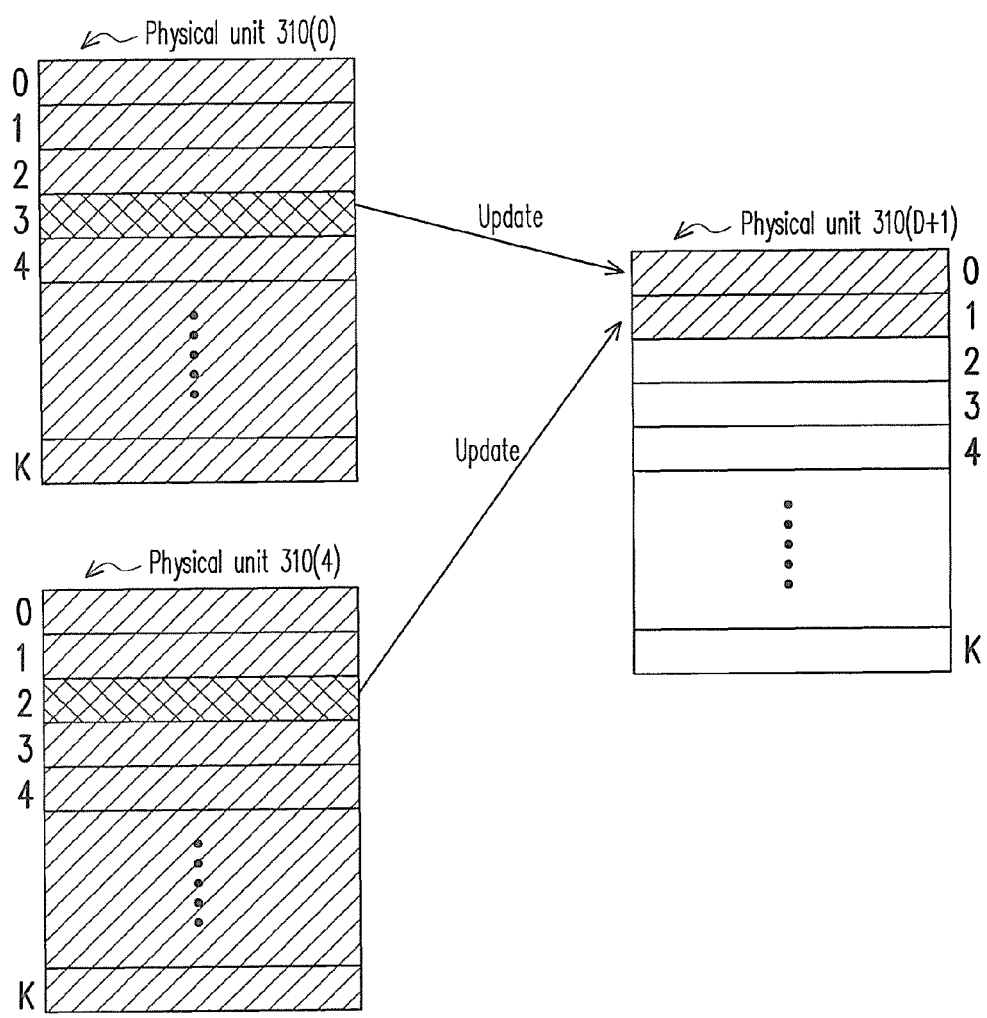
FIGS. 10A-10B illustrate an example of writing data in a random writing mode according to an exemplary embodiment of the present invention.
Figure 10B:
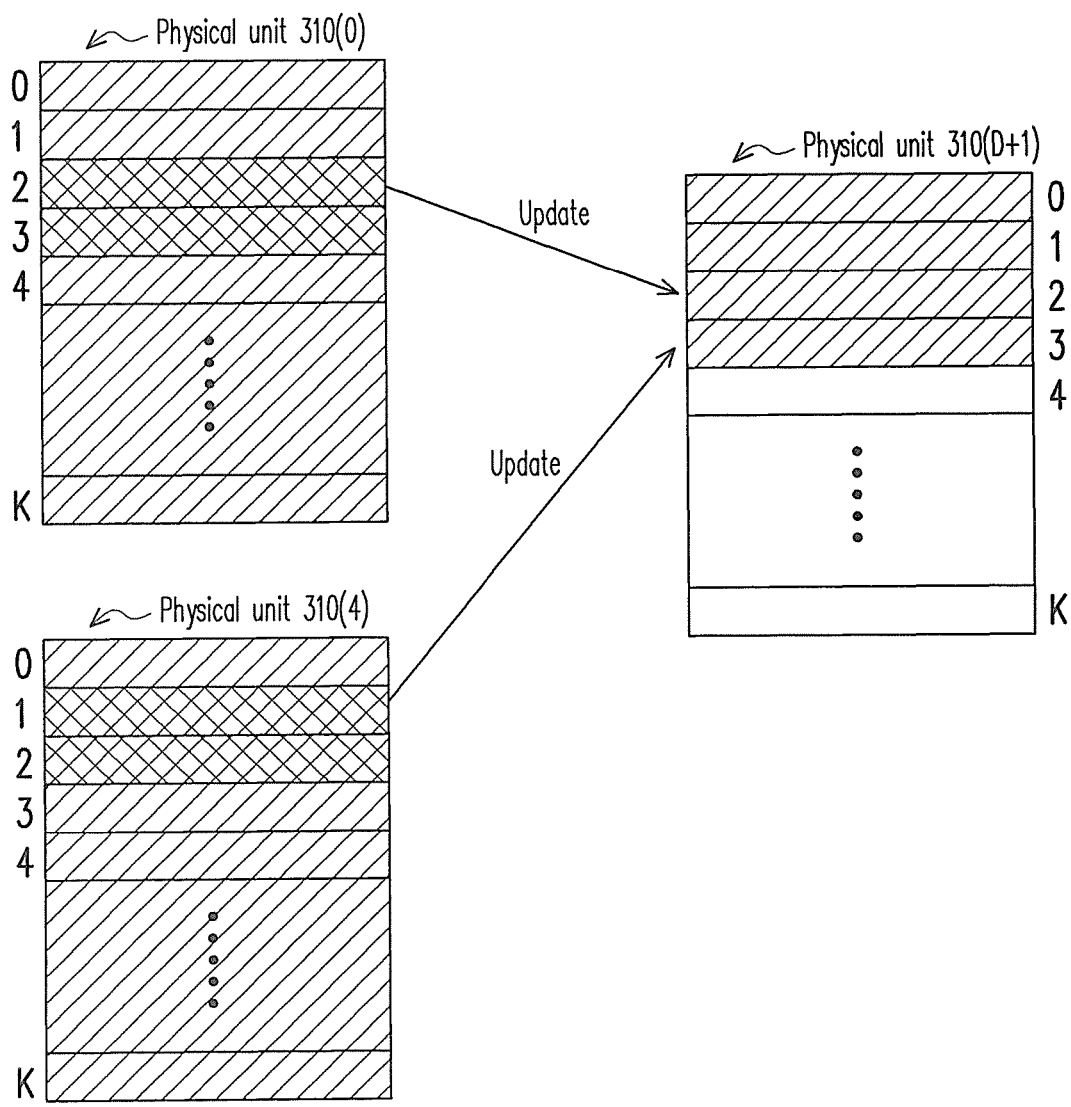

FIGS. 10A-10B illustrate an example of writing data in a random writing mode according to an exemplary embodiment of the present invention. Herein how data (also referred to as first data) belonging to a first logical unit (i.e., the logical unit 510(0)) and data (also referred to as second data) belonging to a second logical unit (i.e., the logical unit 510(4)) from the host system 1000 are written into a random physical unit in a random writing mode is illustrated, wherein it is assumed that the logical unit 510(0) is mapped to a first physical unit (i.e., the physical unit 310(0)) and the logical unit 510(4) is mapped to a second physical unit (i.e., the physical unit 310(4)).

Referring to FIG. 10A, when the data belonging to the $3^{rd}$ logical page of the logical unit 510(0) is to be written in the random writing mode (i.e., the $3^{rd}$ physical page of the physical unit 310(0) is to be updated), the memory management circuit 202 gets a third physical unit (i.e., the physical unit 310(D+1)) from the free area 504 as a random physical unit and writes the data into the $0^{th}$ physical page of the physical unit 310(D+1).

Thereafter, when the data belonging to the $2^{nd}$ logical page of the logical unit 510(4) is to be written in the random writing mode (i.e., the $2^{nd}$ physical page of the physical unit 310(4) is to be updated), the memory management circuit 202 writes the data belonging to the $2^{nd}$ logical page of the logical unit 510(4) into the $1^{st}$ physical page of the physical unit 310(D+1).

Referring to FIG. 10B, in the situation illustrated in FIG. 10A, when the data belonging to the $2^{nd}$ logical page of the logical unit 510(0) is to be written (i.e., the $2^{nd}$ physical page of the physical unit 310(0) is to be updated), the memory management circuit 202 writes the data belonging to the $2^{nd}$ logical page of the logical unit 510(0) into the $2^{nd}$ physical page of the physical unit 310(D+1). Similarly, when the data belonging to the $1^{st}$ logical page of the logical unit 510(4) is to be written (i.e., the $1^{st}$ physical page of the physical unit 310(4) is to be updated), the memory management circuit 202 writes the data belonging to the $1^{st}$ logical page of the logical unit 510(4) into the $3^{rd}$ physical page of the physical unit 310(D+1).

Accordingly, as illustrated in FIG. 10A and FIG. 10B, in the random writing mode, the data is not written according to the corresponding physical pages as illustrated in FIGS. 7-9. Thus, the time spent on moving the data can be saved and the access speed can be increased.

It should be mentioned that since there is a limited number of physical units in the free area 504, during the operation of the memory storage apparatus 100, the number of physical units that can be served as random physical units is also limited. For example, when the number of physical units that have been used as random physical units exceeds a threshold and a physical unit needs to be gotten from the free area 504 as the random physical unit of the logical unit corresponding to the next write command, the memory controller 104 executes a data merging procedure to sort valid data, so as to associate those physical units that contain only invalid data with the free area 504. Or, when the random writing mode ends, the memory controller 104 executes the data merging procedure to sort valid data, so as to associate those physical units that contain only invalid data with the free area 504.

Figure 10C:
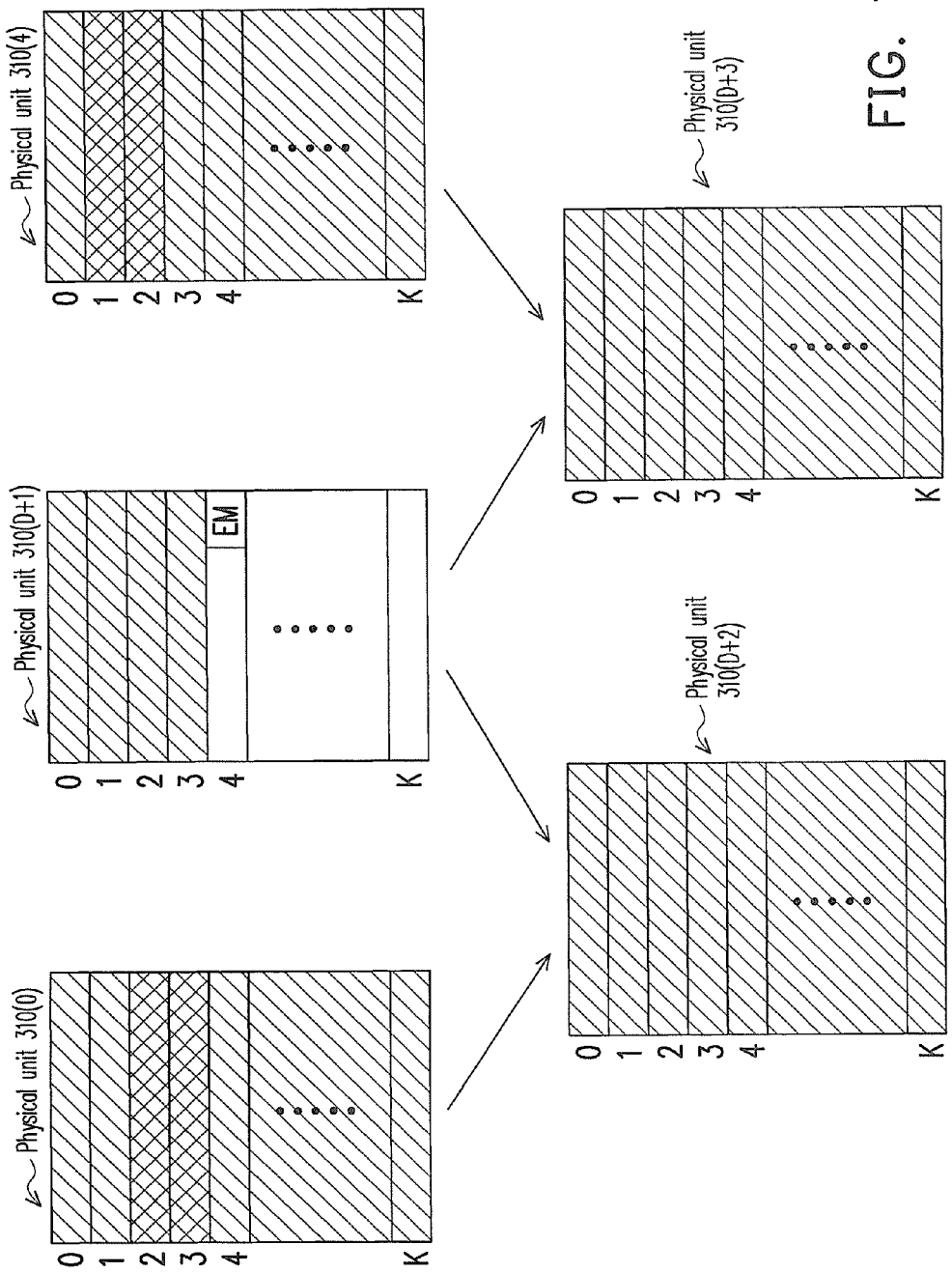
FIG. 10C illustrates an example of executing a data merging procedure on data written in the random writing mode according to an exemplary embodiment of the present invention.

FIG. 10C illustrates an example of executing a data merging procedure on data written in the random writing mode according to an exemplary embodiment of the present invention, wherein how the data merging procedure is executed on the logical unit 510(0) and the logical unit 510(4) is illustrated.

Referring to FIG. 10C, the memory management circuit 202 gets a fourth physical unit (i.e., the physical unit 310(D+2)) and a fifth physical unit (i.e., the physical unit 310(D+3)) from the free area 504. Besides, the memory management circuit 202 moves the valid data belonging to the logical unit 510(0) from the physical unit 310(0) and the physical unit 310(D+1) into the physical unit 310(D+2) and maps (or links) the logical unit 510(0) to the physical unit 310(D+2) in the logical unit-physical unit mapping table. In addition, the memory management circuit 202 moves the valid data belonging to the logical unit 510(4) from the physical unit 310(4) and the physical unit 310(D+1) into the physical unit 310(D+3) and maps (or links) the logical unit 510(4) to the physical unit 310(D+3) in the logical unit-physical unit mapping table.

Particularly, in the present exemplary embodiment, the memory management circuit 202 further writes an end mark EM into the random physical unit 310(D+1). For example, the end mark is recorded in the redundancy bit area of the physical page after the used physical pages (as shown in FIG. 10C). Namely, in the random physical unit 310(D+1), the end mark EM is recorded right after the data of the logical unit 510(0) and the logical unit 510(4) to indicate that the data merging procedure has been executed on the data before the end mark EM. Accordingly, if subsequently a logical unit enters the random writing state and data needs to be written in the random writing mode, the storage space after the end mark EM will be used for storing this data so that the physical units can be effectively used. In the present exemplary embodiment, the end mark EM may be any text or character.

To be specific, as described above, data written in the random writing mode is usually data of small quantities. Thus, there is still unused storage space in the random physical unit 310(D+1). If each random physical unit is erased after the entire storage space in the random physical unit is used, the erasing times of the physical units can be greatly reduced and the lifespan of the memory storage apparatus 100 can be prolonged.

Figure 11:
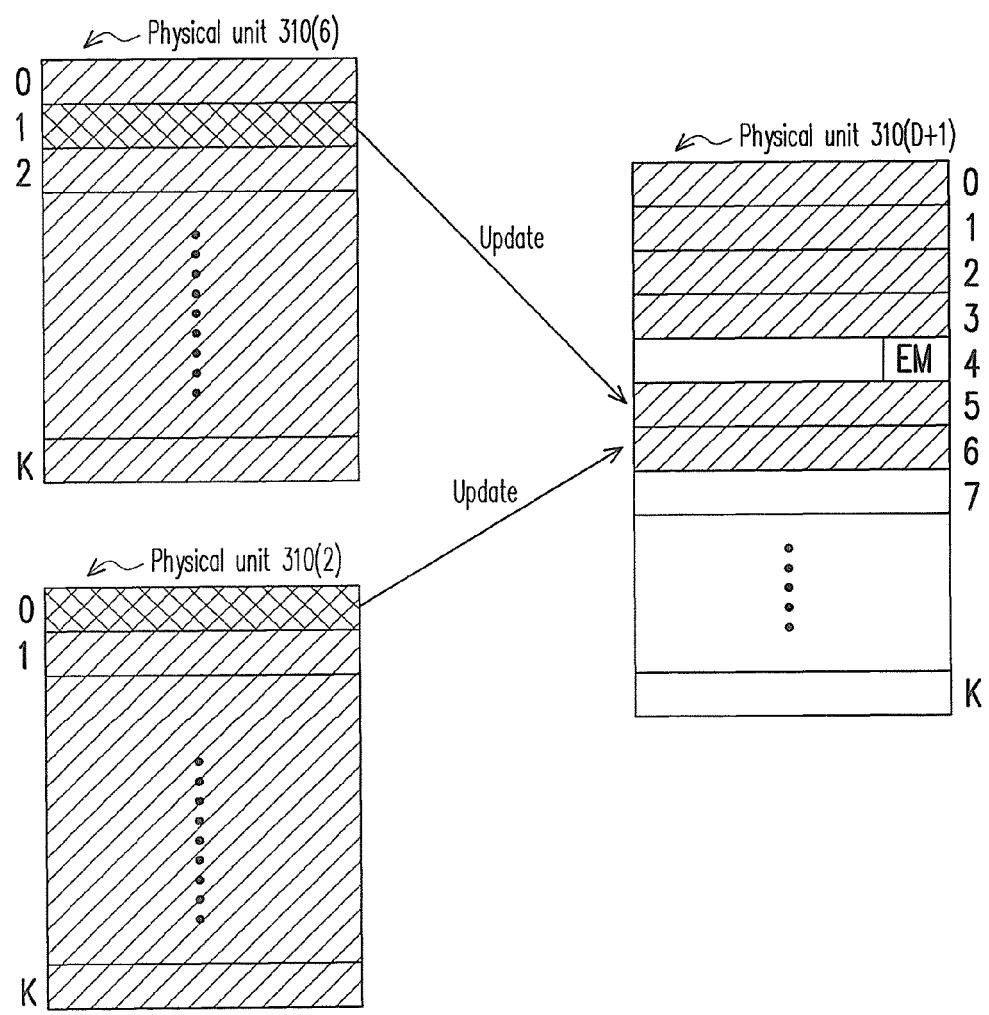
FIG. 11 illustrates an example of writing data in the random writing mode according to another exemplary embodiment of the present invention.

FIG. 11 illustrates an example of writing data in the random writing mode according to another exemplary embodiment of the present invention. Herein how to write data (also referred to as third data) belonging to a third logical unit (i.e., the logical unit 510(6)) and data (also referred to as fourth data) belonging to a fourth logical unit (i.e., the logical unit 510(2)) from the host system 1000 into a random physical unit in the situation illustrated in FIG. 10C through the random writing mode is illustrated, wherein it is assumed that the logical unit 510(6) is mapped to the sixth physical unit (i.e., the physical unit 310(6)) and the logical unit 510(2) is mapped to the seventh physical unit (i.e., the physical unit 310(2)).

Referring to FIG. 11, when the data belonging to the $1^{st}$ logical page of the logical unit 510(6) is to be written in the random writing mode (i.e., the $1^{st}$ physical page of the physical unit 310(6) is to be updated), the memory management circuit 202 writes the data belonging to the $1^{st}$ logical page of the logical unit 510(6) into the $5^{th}$ physical page of the physical unit 310(D+1). Similarly, subsequently, when the data belonging to the $0^{th}$ logical page of the logical unit 510(2) is to be written (i.e., the $0^{th}$ physical page of the physical unit 310(2) is to be updated), the memory management circuit 202 writes the data belonging to the $0^{th}$ logical page of the logical unit 510(2) into the $6^{th}$ physical page of the physical unit 310(D+1).

Figure 12:
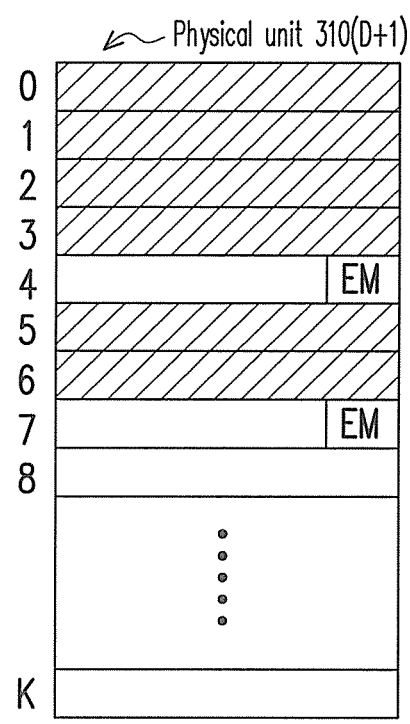
FIG. 12 is a diagram illustrating random physical units according to another exemplary embodiment of the present invention.

Similarly, after the memory management circuit 202 executes the data merging procedure on the logical unit 510(6) and the logical unit 510(2), another end mark EM is recorded into the random physical unit 310(D+1) after the data belonging to the logical unit 510(6) and the logical unit 510(2) (as shown in FIG. 12), so as to indicate that the data merging procedure has been executed on the data before the end mark EM.

It should be mentioned that if a logical unit of the memory storage apparatus 100 enters the random writing state and an abnormal power off occurs, the memory management circuit 202 of the memory controller 104 determines whether the data merging procedure is executed on each data according to the end marks in the random physical unit. For example, the memory management circuit 202 searches for end marks by starting from the last physical page of the random physical unit and identifies the data recorded after the first searched end mark it encounters as the data on which the data merging procedure is not completed.

Figure 13:
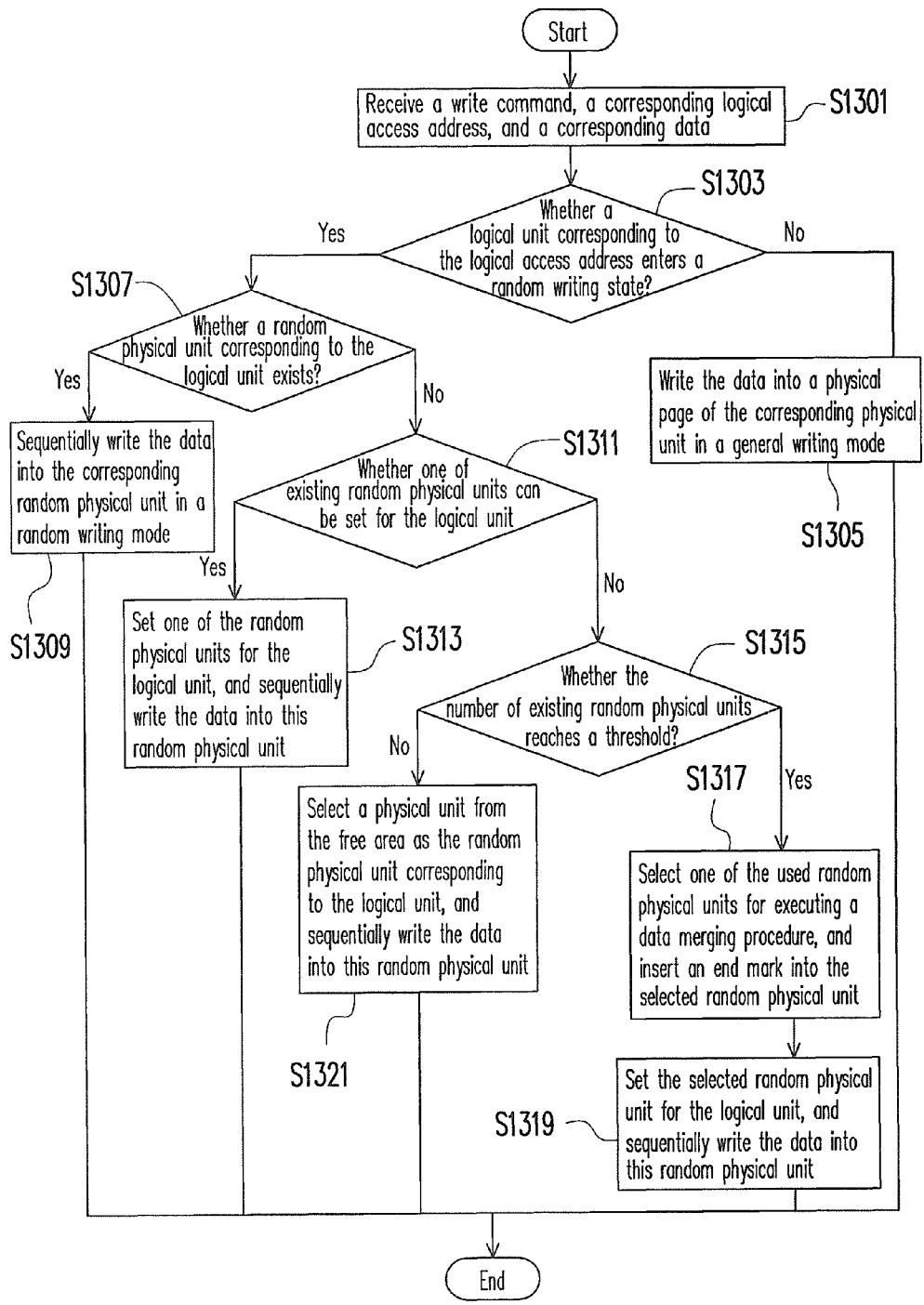
FIG. 13 is a flowchart of a data writing method according to an exemplary embodiment of the present invention.

FIG. 13 is a flowchart of a data writing method according to an exemplary embodiment of the present invention.

Referring to FIG. 13, in step S1301, a write command, a corresponding logical access address, and a corresponding data are received from the host system 1000 by the memory controller 104.

Then, in step S1303, whether the logical unit corresponding to the logical access address enters the random writing state is determined by the memory controller 104.

If the logical unit corresponding to the logical access address does not enter the random writing state, in step 1305, the data is written by the memory controller 104 into a physical page of the corresponding physical unit in the general writing mode. The technique of writing data in the general writing mode has been described above with reference to FIGS. 7-9 therefore will not be described herein.

If the logical unit corresponding to the logical access address enters the random writing state, in step S1307, whether a random physical unit corresponding to the logical unit exists is determined by the memory controller 104

If a random physical unit corresponding to the logical unit exists, in step S1309, the data is sequentially written into the corresponding random physical unit in the random writing mode by the memory controller 104.

If there is no random physical unit corresponding to the logical unit, in step S1311, whether one of the existing random physical units can be set for the logical unit is determined by the memory controller 104. For example, in the present exemplary embodiment, the memory controller 104 stores data corresponding to two logical units into one random physical unit. Accordingly, if any one of the existing random physical units stores data corresponding to only one logical unit, the random physical unit can be set for another logical unit.

If it is determined in step S1311 that one of the existing random physical units can be set for the logical unit, in step S1313, the random physical unit is set for the logical unit and the data is sequentially written into this random physical unit by the memory controller 104.

If it is determined in step S1311 that none of existing random physical units can be set for the logical unit, in step S1315, whether the number of used random physical units reaches the threshold is determined by the memory controller 104.

If the number of used random physical units reaches the threshold, in step S1317, one of the existing random physical units is selected for executing the data merging procedure and an end mark is inserted into the selected random physical unit by the memory controller 104. The techniques of executing the data merging procedure and inserting the end mark have been described above with reference to FIG. 10C therefore will not be described herein.

Next, in step S1319, the selected random physical unit is set for the logical unit, and the data is sequentially written into this random physical unit.

If the number of used random physical units does not reach the threshold, in step S1321, a physical unit is gotten from the free area 504 as the random physical unit corresponding to the logical unit and the data is sequentially written into this random physical unit by the memory controller 104.

In summary, exemplary embodiments of the present invention provide a data writing method and a memory controller and a memory storage apparatus using the same, wherein the storage space in a random physical unit is effectively used so that each physical unit is erased less times and the lifespan of a non-volatile memory module is prolonged. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method, for writing data into a plurality of physical blocks, the data writing method comprising:
    grouping the physical blocks into a plurality of physical units, wherein each of the physical units has a plurality of physical pages, and each of the physical pages has a data bit area and a redundancy bit area;
    grouping the physical units into at least a data area and a free area;
    configuring a plurality of logical units to map to the physical units in the data area;
    getting a physical unit among the physical units of the free area;
    writing at least one data belonging to at least one logical unit among the logical units into a first physical page of the gotten physical unit; and
    after executing a data merging procedure to move the at least one data from the gotten physical unit into another physical unit mapped to the at least one logical unit, writing an end mark into the redundancy bit area of a second physical page subsequent to the first physical page in the gotten physical unit.

2. The data writing method according to claim 1 further comprising:
    writing at least one data belonging to at least one other logical unit among the logical units into the gotten physical unit, wherein in the gotten physical unit, the data belonging to the at least one other logical unit follows the end mark.

3. The data writing method according to claim 1, wherein each of the physical units has a plurality of physical pages, and each of the physical pages has a data bit area and a redundancy bit area,
    wherein the step of writing the end mark into the gotten physical unit comprises:
    writing the end mark into the redundancy bit area of one of the physical pages in the gotten physical unit.

4. A data writing method, for writing data into a plurality of physical blocks, the data writing method comprising:
    grouping the physical blocks into a plurality of physical units, wherein each of the physical units has a plurality of physical pages, and each of the physical pages has a data bit area and a redundancy bit area;
    grouping the physical units into at least a data area and a free area;
    configuring a plurality of logical units to map to the physical units in the data area;
    receiving a first data belonging to a first logical unit among the logical units, wherein the first logical unit is mapped to a first physical unit among the physical units of the data area;
    determining whether the first logical unit enters a random writing state;
    when the first logical unit enters the random writing state, getting a third physical unit among the physical units of the free area, and sequentially writing the first data into a first physical page of the third physical unit;
    receiving a second data belonging to a second logical unit among the logical units, wherein the second logical unit is mapped to a second physical unit among the physical units of the data area;
    determining whether the second logical unit enters the random writing state;
    when the second logical unit enters the random writing state, sequentially writing the second data into a second physical page in the third physical unit;
    executing a data merging procedure on the first logical unit and the second logical unit; and
    after executing the data merging procedure on the first logical unit and the second logical unit to move the first data from the third physical unit into a fourth physical unit and move the second the second data from the third physical unit into a fifth physical unit, writing an end mark into the redundancy bit area of a third physical page subsequent to the second physical page in the third physical unit.

5. The data writing method according to claim 4, wherein the step of executing the data merging procedure on the first logical unit and the second logical unit comprises:
    getting the fourth physical unit among the physical units of the free area;
    writing valid data in the first physical unit and the first data into the fourth physical unit;
    getting the fifth physical unit among the physical units of the free area;
    writing valid data in the second physical unit and the second data into the fifth physical unit;
    mapping the first logical unit to the fourth physical unit, and mapping the second logical unit to the fifth physical unit; and
    erasing the first physical unit and the second physical unit, and associating the first physical unit and the second physical unit with the free area.

6. The data writing method according to claim 4 further comprising:
    receiving a third data belonging to a third logical unit among the logical units, wherein the third logical unit is mapped to a sixth physical unit among the physical units of the data area;
    determining whether the third logical unit enters the random writing state;
    when the third logical unit enters the random writing state, sequentially writing the third data into the third physical unit;
    receiving a fourth data belonging to a fourth logical unit among the logical units, wherein the fourth logical unit is mapped to a seventh physical unit among the physical units of the data area;
    determining whether the fourth logical unit enters the random writing state; and
    when the fourth logical unit enters the random writing state, sequentially writing the fourth data into the third physical unit,
    wherein in the third physical unit, the third data and the fourth data follow the end mark.

7. The data writing method according to claim 6 further comprising:
    executing the data merging procedure on the third logical unit and the fourth logical unit; and
    after executing the data merging procedure on the third logical unit and the fourth logical unit, writing another end mark into the third physical unit, wherein in the third physical unit, the another end mark follows the third data and the fourth data.

8. The data writing method according to claim 6, wherein each of the physical units has a plurality of physical pages, and each of the physical pages has a data bit area and a redundancy bit area,
wherein the step of writing the end mark into the third physical unit comprises:
writing the end mark into the redundancy bit area of one of the physical pages in the third physical unit.

9. A memory controller, for managing a non-volatile memory module, wherein the non-volatile memory module has a plurality of physical blocks, the memory controller comprising:
a host interface, configured to couple to a host system;
a memory interface, configured to couple to the non-volatile memory module; and
a memory management circuit, coupled to the host interface and the memory interface,
wherein the memory management circuit groups the physical blocks into a plurality of physical units, groups the physical units into at least a data area and a free area, and configures a plurality of logical units to map to the physical units in the data area, wherein each of the physical units has a plurality of physical pages, and each of the physical pages has a data bit area and a redundancy bit area,
wherein the memory management circuit further gets a physical unit among the physical units of the free area, and writes at least one data belonging to at least one logical unit among the logical units into a first physical page of the gotten physical unit,
wherein after executing a data merging procedure to move the at least one data from the gotten physical unit into another physical unit mapped to the at least one logical unit, the memory management circuit writes an end mark into the redundancy bit area of a second physical page subsequent to the first physical page in the gotten physical unit.

10. A memory controller, for managing a non-volatile memory module, wherein the non-volatile memory module has a plurality of physical blocks, the memory controller comprising:
a host interface, configured to couple to a host system;
a memory interface, configured to couple to the non-volatile memory module; and
a memory management circuit, coupled to the host interface and the memory interface,
wherein the memory management circuit groups the physical blocks into a plurality of physical units, groups the physical units into at least a data area and a free area, and configures a plurality of logical units to map to the physical units in the data area, wherein each of the physical units has a plurality of physical pages, and each of the physical pages has a data bit area and a redundancy bit area,
wherein the memory management circuit further receives a first data belonging to a first logical unit among the logical units, wherein the first logical unit is mapped to a first physical unit among the physical units of the data area;
wherein the memory management circuit further determines whether the first logical unit enters a random writing state,
wherein when the first logical unit enters the random writing mode, the memory management circuit further gets a third physical unit among the physical units of the free area and sequentially writes the first data into a first physical page of the third physical unit,
wherein the memory management circuit further receives a second data belonging to a second logical unit among the logical units, wherein the second logical unit is mapped to a second physical unit among the physical units in the data area,
wherein the memory management circuit further determines whether the second logical unit enters the random writing state,
wherein when the second logical unit enters the random writing state, the memory management circuit further sequentially writes the second data into a second physical page of the third physical unit,
wherein the memory management circuit further executes a data merging procedure on the first logical unit and the second logical unit, and after executing the data merging procedure on the first logical unit and the second logical unit to move the first data from the third physical unit into a fourth physical unit and move the second the second data from the third physical unit into a fifth physical unit, the memory management circuit further writes an end mark into the redundancy bit area of a third physical page subsequent to the second physical page in the third physical unit.

11. The memory controller according to claim 10, wherein in the data merging procedure executed on the first logical unit and the second logical unit, the memory management circuit gets the fourth physical unit among the physical units of the free area, writes valid data in the first physical unit and the first data into the fourth physical unit, gets the fifth physical unit among the physical units of the free area, writes valid data in the second physical unit and the second data into the fifth physical unit, maps the first logical unit to the fourth physical unit, maps the second logical unit to the fifth physical unit, erases the first physical unit and the second physical unit, and associates the first physical unit and the second physical unit with the free area.

12. The memory controller according to claim 10,
wherein the memory management circuit further receives a third data belonging to a third logical unit among the logical units, wherein the third logical unit is mapped to a sixth physical unit among the physical units of the data area,
wherein the memory management circuit further determines whether the third logical unit enters the random writing state,
wherein when the third logical unit enters the random writing state, the memory management circuit further sequentially writes the third data into the third physical unit,
wherein the memory management circuit further receives a fourth data belonging to a fourth logical unit among the logical units, wherein the fourth logical unit is mapped to a seventh physical unit among the physical units in the data area,
wherein the memory management circuit further determines whether the fourth logical unit enters the random writing state,
wherein when the fourth logical unit enters the random writing state, the memory management circuit further sequentially writes the fourth data into the third physical unit,
wherein in the third physical unit, the third data and the fourth data follow the end mark.

13. The memory controller according to claim 10,
wherein the memory management circuit further executes the data merging procedure on the third logical unit and the fourth logical unit, wherein after executing the data merging procedure on the third logical unit and the fourth logical unit, the memory management circuit further writes another end mark into the third physical unit, wherein in the third physical unit, the another end mark follows the third data and the fourth data.

14. The memory controller according to claim 10, wherein each of the physical units has a plurality of physical pages, and each of the physical pages has a data bit area and a redundancy bit area, wherein the memory management circuit writes the end mark into the redundancy bit area of one of the physical pages in the third physical unit.

15. A memory storage apparatus, comprising:

a connector, configured to couple to a host system;

a non-volatile memory module, having a plurality of physical blocks; and a memory controller, coupled to the connector and the non-volatile memory module, wherein the memory controller groups the physical blocks into a plurality of physical units, groups the physical units into at least a data area and a free area, and configures a plurality of logical units to map to the physical units in the data area, wherein each of the physical units has a plurality of physical pages, and each of the physical pages has a data bit area and a redundancy bit area, wherein the memory controller further receives a first data belonging to a first logical unit among the logical units, wherein the first logical unit is mapped to a first physical unit among the physical units in the data area, wherein the memory controller further determines whether the first logical unit enters a random writing state, wherein when the first logical unit enters the random writing state, the memory controller further gets a third physical unit among the physical units of the free area and sequentially writes the first data into a first physical page of the third physical unit, wherein the memory controller further receives a second data belonging to a second logical unit among the logical units, wherein the second logical unit is mapped to a second physical unit among the physical units in the data area, wherein the memory controller further determines whether the second logical unit enters the random writing state, wherein when the second logical unit enters the random writing state, the memory controller further sequentially writes the second data into a second physical page of the third physical unit, wherein the memory controller further executes a data merging procedure on the first logical unit and the second logical unit, and after executing the data merging procedure on the first logical unit and the second logical unit to move the first data from the third physical unit into a fourth physical unit and move the second the second data from the third physical unit into a fifth physical unit, the memory controller further writes an end mark into the redundancy bit area of a third physical page subsequent to the second physical page in the third physical unit, wherein in the third physical unit, the end mark follows the first data and the second data.

16. The memory storage apparatus according to claim 15, wherein in the data merging procedure executed on the first logical unit and the second logical unit, the memory controller gets the fourth physical unit among the physical units of the free area, writes valid data in the first physical unit and the first data into the fourth physical unit, gets the fifth physical unit among the physical units of the free area, writes valid data in the second physical unit and the second data into the fifth physical unit, maps the first logical unit to the fourth physical unit, maps the second logical unit to the fifth physical unit, erases the first physical unit and the second physical unit, and associates the first physical unit and the second physical unit with the free area.

17. The memory storage apparatus according to claim 15, wherein the memory controller further receives a third data belonging to a third logical unit among the logical units, wherein the third logical unit is mapped to a sixth physical unit among the physical units of the data area, wherein the memory controller further determines whether the third logical unit enters the random writing state, wherein when the third logical unit enters the random writing state, the memory controller further sequentially writes the third data into the third physical unit, wherein the memory controller further receives a fourth data belonging to a fourth logical unit among the logical units, wherein the fourth logical unit is mapped to a seventh physical unit among the physical units of the data area, wherein the memory controller further determines whether the fourth logical unit enters the random writing state, wherein when the fourth logical unit enters the random writing state, the memory controller further sequentially writes the fourth data into the third physical unit, wherein in the third physical unit, the third data and the fourth data follow the end mark.

18. The memory storage apparatus according to claim 15, wherein the memory controller further executes the data merging procedure on the third logical unit and the fourth logical unit, wherein after executing the data merging procedure on the third logical unit and the fourth logical unit, the memory controller further writes another end mark into the third physical unit, wherein in the third physical unit, the another end mark follows the third data and the fourth data.

19. The memory storage apparatus according to claim 15, wherein each of the physical units has a plurality of physical pages, and each of the physical pages has a data bit area and a redundancy bit area, wherein the memory controller writes the end mark into the redundancy bit area of one of the physical pages in the third physical unit.

\* \* \* \* \*